(12) United States Patent
Moretz et al.

(10) Patent No.: US 10,641,405 B2
(45) Date of Patent: May 5, 2020

(54) DIFFERENTIAL PRESSURE ACTUATED VALVE

(71) Applicants: R. Dale Moretz, Jackson, MI (US); Jeffrey D. Moretz, New Haven, CT (US)

(72) Inventors: R. Dale Moretz, Jackson, MI (US); Jeffrey D. Moretz, New Haven, CT (US)

( * ) Notice: Subject to any disclaimer, the term of this patent is extended or adjusted under 35 U.S.C. 154(b) by 64 days.

(21) Appl. No.: 15/817,244

(22) Filed: Nov. 19, 2017

(65) Prior Publication Data
US 2019/0154162 A1    May 23, 2019

(51) Int. Cl.
*F16K 17/04* (2006.01)
*F16K 17/32* (2006.01)
(Continued)

(52) U.S. Cl.
CPC .............. *F16K 17/046* (2013.01); *F16K 3/30* (2013.01); *F16K 17/32* (2013.01); *F16K 25/005* (2013.01);
(Continued)

(58) Field of Classification Search
CPC . Y10T 137/7723; F16K 17/046; F16K 17/20; F16K 17/28; F16K 17/34;
(Continued)

(56) References Cited

U.S. PATENT DOCUMENTS 2,266,421 A * 12/1941 Griffith ................. F16K 1/2028
                                                     137/463
2,673,707 A *  3/1954 Mcrae .................. F16K 17/386
                                                     137/68.11

(Continued)

*Primary Examiner* — Jessica Cahill
*Assistant Examiner* — Patrick C Williams
(74) *Attorney, Agent, or Firm* — Quinn IP Law

(57) ABSTRACT

This specification discloses a Valve designed to be used in systems wherein it is desirable to activate and close the valve in response-to changes in pressure inside a pipeline downstream of the valve, without any dependency on electronic communications or external power, relying solely on the energy within the pipeline for sensing the differences and for closing the valve. The present invention is specifically targeted to petroleum pipelines, but is applicable to fluid pipelines and piping systems for any fluid, liquid or gaseous. The Valve functions by utilizing a lowered pressure downstream of the Valve in opposition to the full pipeline pressure on the upstream side of the Valve. The pressure downstream is typically lowered by providing a flow restrictor on the downstream side of the Valve, or incorporated into the downstream side of the Valve, in a system with a pump on the downstream side of the section of the pipeline it is intended to protect. A flapper, or hinged gate, is held in the open position by exposing said gate to the full line pressure on the side where the line pressure enters the Valve, while the side of the flapper opposite the flow is exposed to the lowered pressure or the pipeline downstream of the restrictor through a connection with the downstream pipeline. The differential pressure holds the hinged gate in the open position so long as the required differential is maintained. When a pre-determined compromise of the differential pressure occurs, the magnitude of which is designed into the Valve for each application or installation, and/or adjusted in the field by means provided, the hinged gate is freed from the open position and moves into sealing contact with the closed position seat.

7 Claims, 6 Drawing Sheets

(51) Int. Cl.
*F16K 3/30* (2006.01)
*F16K 31/12* (2006.01)
*F16K 27/00* (2006.01)
*F16K 25/00* (2006.01)

(52) U.S. Cl.
CPC .............. *F16K 27/00* (2013.01); *F16K 31/12* (2013.01); *Y10T 137/7723* (2015.04)

(58) Field of Classification Search
CPC ...... F16K 17/164; F16K 25/005; F16K 27/00; F16K 3/30; F16K 31/12
See application file for complete search history.

(56) References Cited

U.S. PATENT DOCUMENTS

| | | | | |
|---|---|---|---|---|
| 3,602,250 | A * | 8/1971 | Neenan | A63B 69/125 137/386 |
| 4,004,607 | A * | 1/1977 | Freese | F16K 17/20 137/460 |
| 4,067,359 | A * | 1/1978 | Kwast | F16K 17/00 137/461 |
| 5,535,777 | A * | 7/1996 | Maracchi | F16K 17/164 137/456 |
| 9,010,360 | B1 * | 4/2015 | Older | F16K 21/16 137/486 |
| 2002/0139438 | A1 * | 10/2002 | Lange | B67D 7/04 141/231 |

* cited by examiner

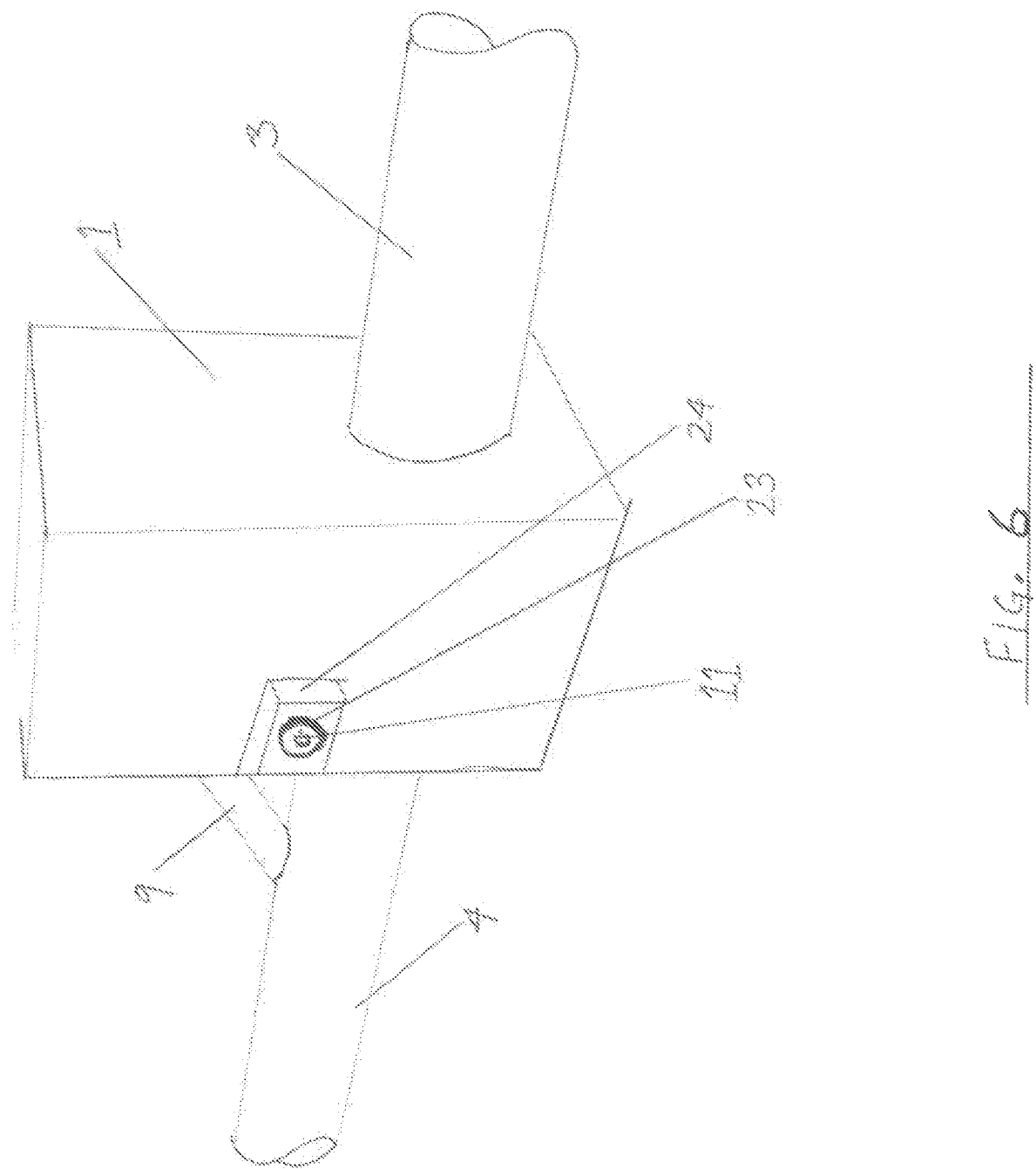

DIFFERENTIAL PRESSURE ACTUATED VALVE

CROSS-REFERENCE TO RELATED APPLICATIONS

This application is for a new patent, pursuant to Provisional Patent Application 62/424,442, filed on Nov. 19, 2016.

STATEMENT REGARDING FEDERALLY SPONSORED RESEARCH OR DEVELOPMENT

Not Applicable

INCORPORATION BY REFERENCE OF MATERIAL SUBMITTED ON A COMPACT DISC

Not Applicable

FIELD OF INVENTION

The present invention relates to the field of fluid valves utilized in myriad applications, especially valves utilized to selectively stop fluid flow in response to the development of specific conditions, wherein flow from upstream needs to be stopped in response to the development of leaks downstream of the valve, and more particularly for applications in which the valve closure needs to be automatic in response to the development of leaks downstream of the valve.

BACKGROUND OF THE INVENTION

Valves of many types have been developed and utilized for controlling flow of virtually every kind of material capable of flowing, and vary from very simple gate valves to precision valves such as needle valves used to finely control and adjust flows in machinery, laboratory equipment, medication delivery systems, process industries, and myriad other applications.

Many critical materials are transported over long distances through pipelines, including crude oil and most petroleum products. These pipelines cross many very sensitive natural features, including rivers and streams, lakes, ocean inlets, long stretches of ocean in ocean-to-land delivery of crude oil and natural gas, bogs and marshes, and stream and aquifer watersheds. Pipeline breaches in these areas cause considerable damage to the environment, are very costly to clean up, and often impossible to completely remediate.

The present invention is intended to provide a system that can very reliably stop the flow in a pipeline if the pipeline is breached downstream of the Valve, and is intended as a component in a system utilizing negative pressure or reduced pressure in a pipeline section traversing a sensitive area, in addition to any applications in which it is desirable to provide reliable flow interruption to prevent spills or industrial mishaps.

Of special significance is the fact that the present invention provides automatic shutoff, when properly sited and installed, without any reliance on communication or energy infrastructure, making it capable of reliable function even in the event that an event requiring flow interruption (a breach or the development of a leak in a pipeline section) occurs concurrently with or because of a catastrophic event that disables communication and power infrastructures, and is readily adaptable to function in almost any conditions of terrain elevation, fluid viscosity, flow rate, pipeline size, and other variables, and is capable of sensitivity variations both in the initial engineering and construction and while in operation.

SUMMARY OF THE INVENTION

This application is pursuant to Provisional Patent Application 62/424,442.

The present invention provides an alternative to a powered or manual Valve for use in applications wherein the Valve must function reliably in the absence of electric power or other power sources, electrical or electronic signaling, or constant human monitoring, and wherein the need for valve closing is or can be indicated by changes in line pressure downstream of the valve. The Valve relies on differential pressures to both sense the need for closure and to affect the closure. It is specifically designed to be used where a pump downstream of the Valve and the section of pipeline needing protection, and a flow restrictor at the outflow side of the valve, or very close thereto, creates a lower pressure downstream of the Valve than upstream of the Valve.

The Valve consists of a housing, or body with two chambers; a hinged gate, or flapper, to close flow through the primary chamber, a seat for holding the main hinged gate or flapper in the open position, inlets and outlets for the pipeline, a reduced pressure tube for delivering the reduced pressure that holds the valve in the open position, and various other features together constituting a Valve that is capable of being held in the open position by the differential pressure. The hinged gate or flapper is held in the open position, where it is in sealing contact with a seat, by providing a connection, or loop, between the low-pressure side of the flapper and the lower pressure downstream of the flow restriction. This low-pressure delivery tube or pipe is also equipped with a gate, or flapper, which is held open so long as the primary gate is held against the seal by the lower pressure in the low-pressure chamber. The other side of the main gate or flapper will be, in the open position, in contact with the higher pressure being fed into the Valve from upstream. This differential holds the flapper in the open position, similar to the way air passing over an airplane wing creates lift. So long as the lower or negative pressure is maintained, the hinged gate remains held against its seal outboard of the opening between the lower-pressure and line pressure chambers of the housing. This reduced pressure is compromised by a breach in the pipeline in the protected area, or crossing, as a part of the demand of the pump on the downstream side of the crossing is satisfied by the material being drawn into the pipeline through the breach. The result is a rise in the pressure in the pipeline between the restrictor and the pump. This rise in pressure causes the hinged gate to be released from sealing contact with its seal. Upon release, and dropping into the line flow through the valve, the low-pressure side of the hinged gate is subjected to the line pressure, which pushes it into the closed position and holds it tightly in the closed position. A seat, with a seal, is provided for the Valve gate, or flapper to close against upon actuation by an increase in the pressure downstream of the Valve. At the same time, the secondary gate provided for the low-pressure delivery tube or pipe is released from its open position, and moves into sealing contact with the seat on the reduced-pressure source tube, preventing the material in the line from bypassing the closed valve through the reduced pressure source loop.

The restriction to flow may be provided either as a part of the valve assembly or separately downstream of the Valve. In the preferred embodiment, the restriction is provided by a cylindrical insert in the outlet pipe that provides, in addition to the restriction, the seat for the seal for the hinged gate and may also provide a coupling mechanism needed to connect the Valve to the downstream pipeline.

The Valve is typically provided with a means to reset the hinged gate to the open position whenever it is desired to continue the material flow. After correction of the cause for deployment to the closed position, the Valve may be reset by several means; for instance, a remotely controlled, powered system embodied in the Valve assembly, or a manual assembly similar to the one shown in the accompanying illustrations.

The most essential and central characteristics of the Valve and its application are its location on the upstream side of a crossing, or section of pipeline for which protection is desired, with a pump on the downstream side of the protected section; the provision of a flow restrictor, either a part of the Valve itself or downstream of the Valve; the hinged gate, or flapper and the mechanisms provided to hold it in the open position using the differential between the pressure in the upstream pipeline and the pressure in the pipeline downstream of the restrictor, along with a loop transferring the reduced pressure downstream of the restrictor to the chamber on the reduced pressure side of the hinged gate when in the open position; the balance of pressures and forces allowing the hinged gate or flapper to be freed from its sealing contact in the open position upon an increase in the pressure downstream of the restrictor, and pushed into the closed position using only its mounting and the upstream line pressure; the secondary hinged gate that closes the reduced pressure access upon closure of the main hinged gate; and the Valve's capacity to be adapted to function reliably regardless of pipeline size, topography, transported materials, or other variables.

BRIEF DESCRIPTION OF THE DRAWINGS

FIG. 6 is an isometric view showing the provision for resetting the valve, in the form of the main gate pivot pin protruding through a bearing and seal in the wall of the housing and into a sealable and securable reset housing.

WRITTEN DESCRIPTION

Figure 1:
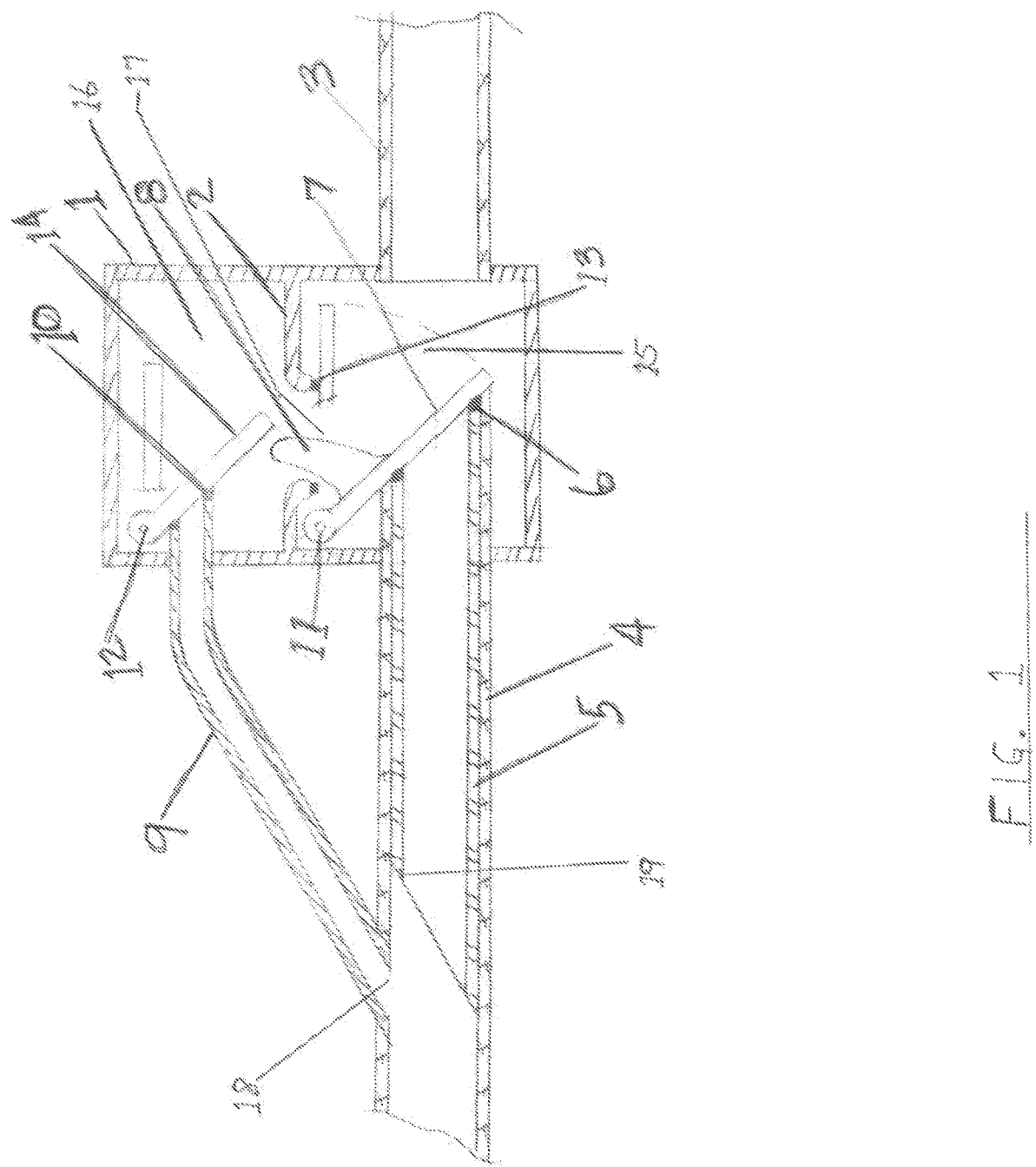
FIG. 1 is a cross-sectional view of the valve shown in a rectangular configuration, as it would appear while closed (stopping flow of the transported material).

As required, detailed embodiments of the present invention are disclosed herein. However, it is to be understood that the disclosed embodiments are merely exemplary of the invention, which may be embodied in various and alternative forms. For instance, the embodiments shown, for ease of interpretation and understanding, are of a rectangular configuration. The valve may very well in many if not most applications be shaped as an expanded section of the pipeline in which it is to be installed. The accompanying drawings are not necessarily to scale, and some features may be exaggerated or minimized to show details of various components or features. Therefore, specific structural and functional details disclosed herein are not to be interpreted as limiting, but merely as a representative basis for teaching one skilled in the art to variously employ the present invention.

Referring now to the drawings, wherein the numerals refer to like of corresponding parts throughout several views, the present invention is generally characterized as a valve actuated by changes in differential pressures in a pipeline upstream of the valve as opposed to downstream of the valve, comprised of a housing, pipeline-like extensions entering the housing, and two hinged gates providing valving action, along with the mating seals and pivot pins.

As disclosed in the patent application, the housing of such a differential-pressure actuated valve is comprised of an upstream wall accepting an entry or connection of the pipeline, an downstream wall which accommodates the exit and connection to the downstream portion of the pipeline, a rear wall which provides both a rear closure of the housing and a mounting for one end of two hinge pins, a front wall which provides a front closure and the mounting for the other end of two hinge pins, and a partition separating two compartments of the valve, the line pressure compartment (generally on the bottom of the valve) and a low-pressure compartment (generally on the top of the valve, and a top wall and bottom wall completing the closure of the valve housing. This housing may be of any compatible shape, including a shape that appears as a larger diameter pipe, tapered to connect with the pipeline on either end.

As disclosed in this patent application, the hinged gates, or flappers, move between an open and a closed position. Both will be open simultaneously, the main gate permitting flow of the transported material, and the secondary gate permitting the communication with the low-pressure portion of the pipeline downstream of the valve. When the valve is in the open condition, the main gate is held against the seal provided on the high-pressure side of the partition by the differential pressure, which creates lift on the upper, or low-pressure side of the gate. When the pressure communicated to the low-pressure chamber rises, as a result of leakage in the pipeline between the valve and restrictor and the pump on the downstream side of the crossing, the rising pressure no longer holds the main gate in the open position seated against the partition seal, and it is allowed to fall into the flow and is pushed into sealing contact with the seal provided on the face of pipe or pipe extension on the outlet side (downstream side) of the valve. The cam on the upstream side of the main gate which holds the low-pressure gate in the open position is no longer contacting the low-pressure gate, and it is allowed to fall into position sealing the low-pressure tube, preventing the transported material from by-passing the valve through this low-pressure tube. Upon reset, the cam on the main gate pushes the low-pressure gate back into the open position, allowing the low pressure to again hold the main gate in the open position. Resetting of the valve may be by any of several means, including manual, as shown in FIG. 6, or by adding a motor that may be manually or remotely activated. By using a motor, the system can be fully enclosed, with no potential for any leakage during reset.

With reference now being made to FIG. 1, wherein the housing, 1, is shown in cross section, allowing the internal components to be viewed as they appear when the valve is in the closed position, preventing flow of the transported material. The partition, 2, is shown separating the upstream line pressure chamber of the valve, 15, from the downstream pressure chamber, 16, and including the opening between the chambers, 17, and the seal, 13, attached in this view to the partition near the opening, 17, between the chambers. Transported material is delivered to the upstream pressure chamber, 15, through the upstream pipeline adaptor, 3. In this illustration, the main gate, 7, is shown deployed, having pivoted on its hinge pin, 11, and into sealing contact with the seal, 6, at the end of the downstream pipeline adaptor, 4, and the restrictor insert, 5, closing the flow of transported material downstream of the valve. The cam, 8, that projects from the upstream side of the main gate, 7, is shown disengaged from the low pressure access tube gate, 14, allowing the gate, 14, to move into sealing contact with the seal, 10, located on the upstream end of the low pressure access tube, 9, closing the passage to any transported material being allowed to pass downstream when the valve in is the closed position. The gate, 14, pivots on its hinge pin, 12, to allow movement between the open position and the closed position shown in this view. The downstream pipeline adaptor, 4, is shown protruding into the lower, or upstream pressure chamber, 15, and terminating with an angled end. The restrictor insert, 5, is shown terminating with an angle identical with the angle at the upstream termination of the downstream pipeline adaptor, but short of the termination of the downstream pipe adaptor, 4, thereby providing a surface for retaining the seal, 6. This restrictor insert, 5, terminates on the downstream end with an angle such that the short end of the angle, 19, is just upstream of the opening, 18, of the low pressure access tube, 9, into the downstream pipeline adaptor, 4, providing an expanded flow cross section and enhancing the low or negative pressure being communicated to the upper, or downstream pressure chamber, 16. The opening, 18, of the low pressure access tube, 9, is placed at an angle to the downstream pipeline adaptor in a way designed to realize somewhat of a venturi effect to enhance the negativity of the pressure being communicated through it.

Figure 2:
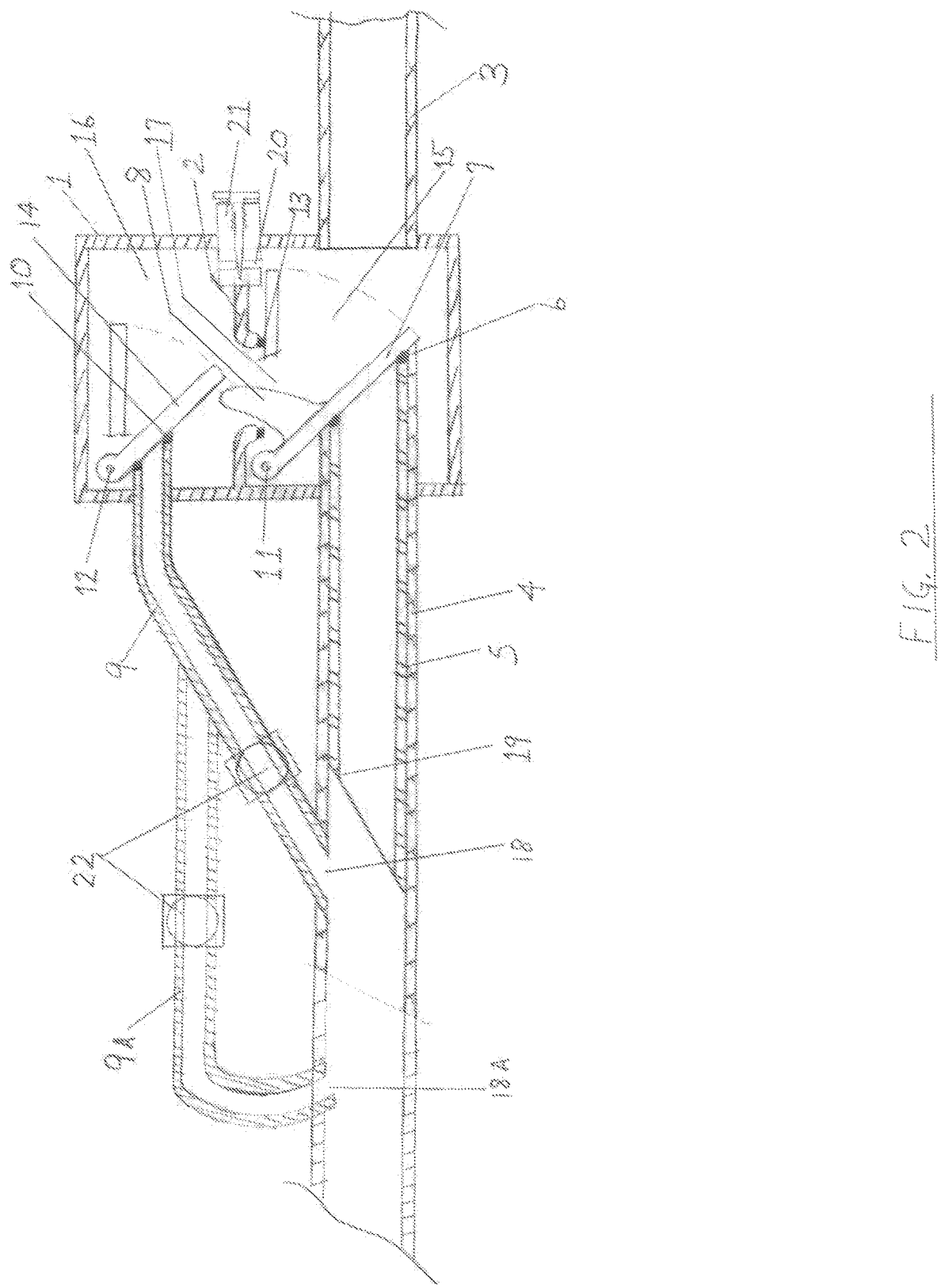
FIG. 2 is a cross-sectional view identical to FIG. 1 except for showing optional methods for adjusting the sensitivity of the valve to the differential pressures.

Now referring to FIG. 2, a second low pressure access tube, 9A, is shown, communicating with the downstream pipeline adaptor, 4, downstream of the primary low pressure access tube, 9, and with its opening, 18A, tilted upstream, as opposed to the downstream angle of the opening, 18, of the primary low pressure access tube, 9. It will therefore, communicate a somewhat higher pressure toward the low pressure or downstream pressure chamber, 16, than will the primary access tube, 9, whose opening is angled downstream. By adjusting the needle valves, 22, in each of the access tubes, 9 and 9A, the differential can be tuned to achieve a more desirable sensitivity, taking into consideration the specifics of the installation. Another needle valve, 21, is shown protruding through the rear wall of the housing, 1, and including an orifice, 20, through the partition, 2, between the upstream pressure chamber, 15 and the downstream pressure chamber, 16. This needle valve may be adjusted to allow none, more or less of the high pressure in the lower, or upstream pressure chamber, 15, to enter the upper, or downstream pressure chamber, 16, thereby providing another method of tuning the valves sensitivity. Yet another feature, not shown, is the provision of a gate valve upstream of the differential pressure actuated valve, which can provide yet another method for tuning the sensitivity as well as providing an aid in resetting the valve after deployment, or closure.

Figure 3:
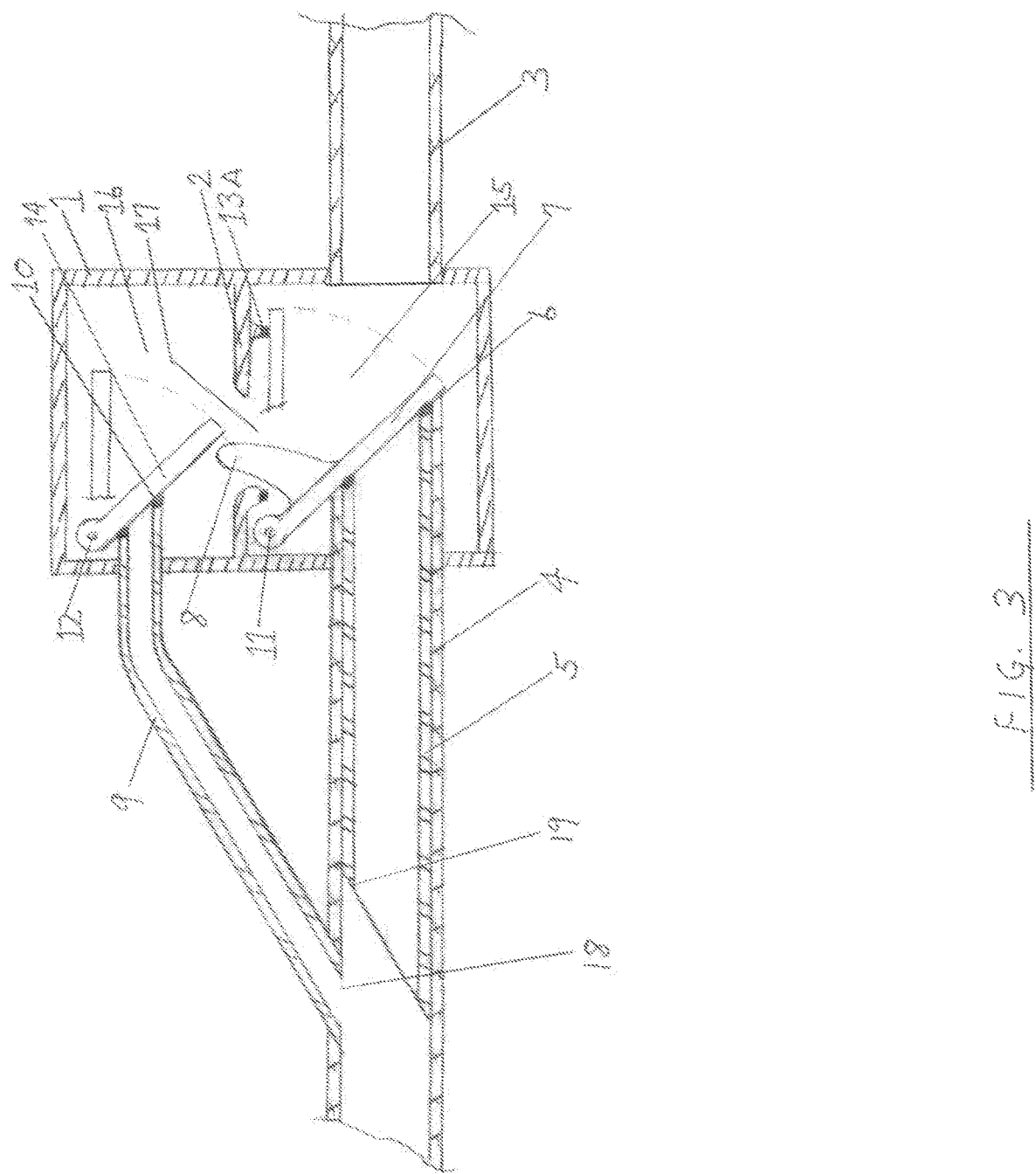
FIG. 3 is a cross-sectional view identical to FIG. 1 except for showing another option for adjusting the sensitivity of the valve to the differential pressures.

Now referring to FIG. 3, yet another method of tuning the valve sensitivity is shown, wherein the seal, 13, is shown further from the opening, 17 in the partition, 2, thereby increasing the area of the primary gate, 7, that is exposed to the lower pressure communicated through the low pressure access tube, 9, to the low pressure of downstream pressure chamber, 16. The area of the primary gate, 7, to be exposed to the low pressure will be determined for each valve depending on the variables of the specific application.

Figure 4:
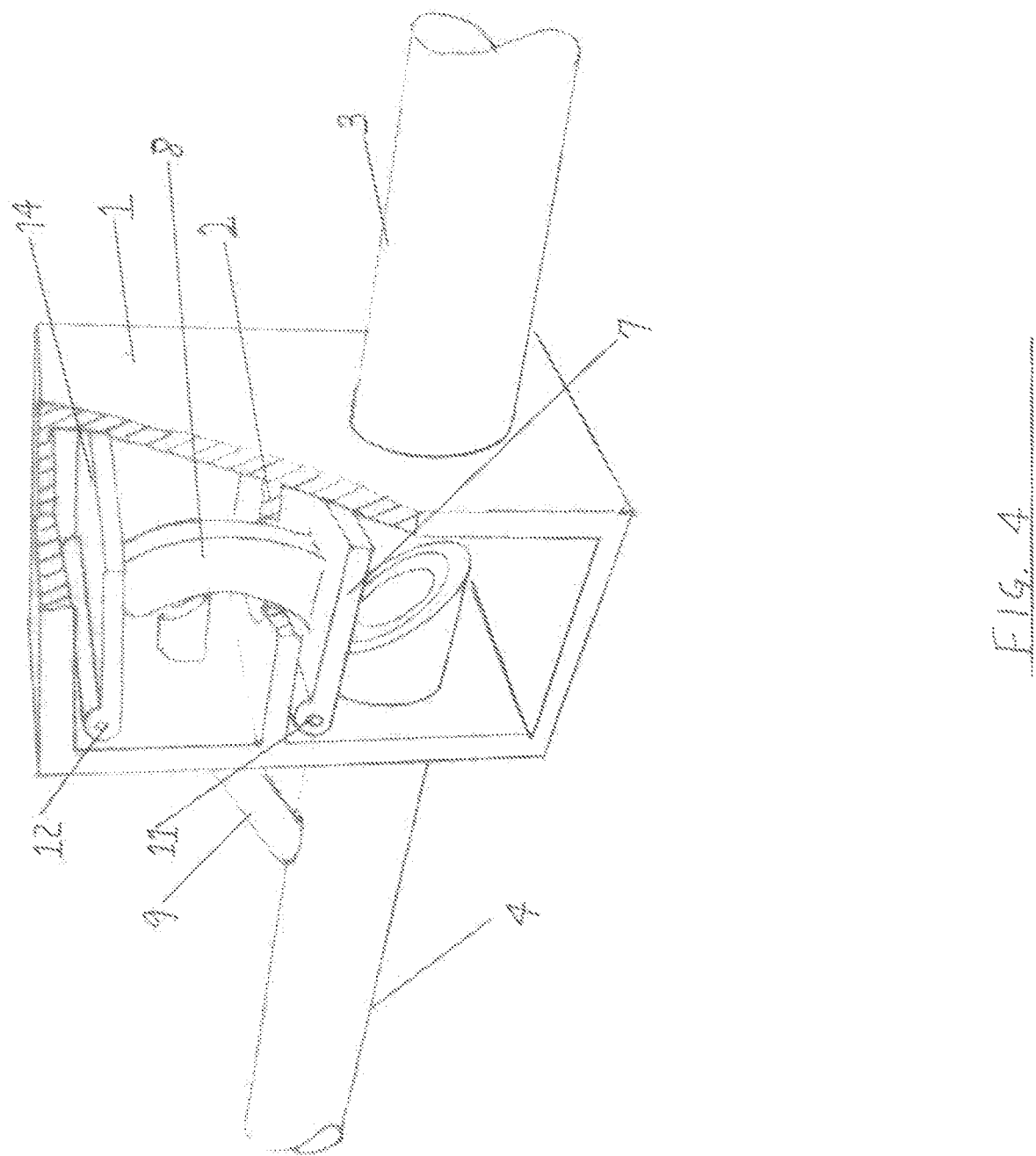
FIG. 4 is a stripped-down cutaway isometric view of the valve as it would appear in the open configuration, allowing the flow of the transported material.

Referring now to FIG. 4, the valve is shown as it would appear in the open position, with the primary gate, 7, having been pivoted on the hinge pin, 11, to the open position, held against the seal (not shown) on the underneath side of the partition, 2, with the cam, 8, having rotated the low pressure access tube gate, 14, to the open position, holding it in the open position. This is the normal "set" condition of the valve, from which it deploys to the closed condition in response to a rise in downstream pressure.

Figure 5:
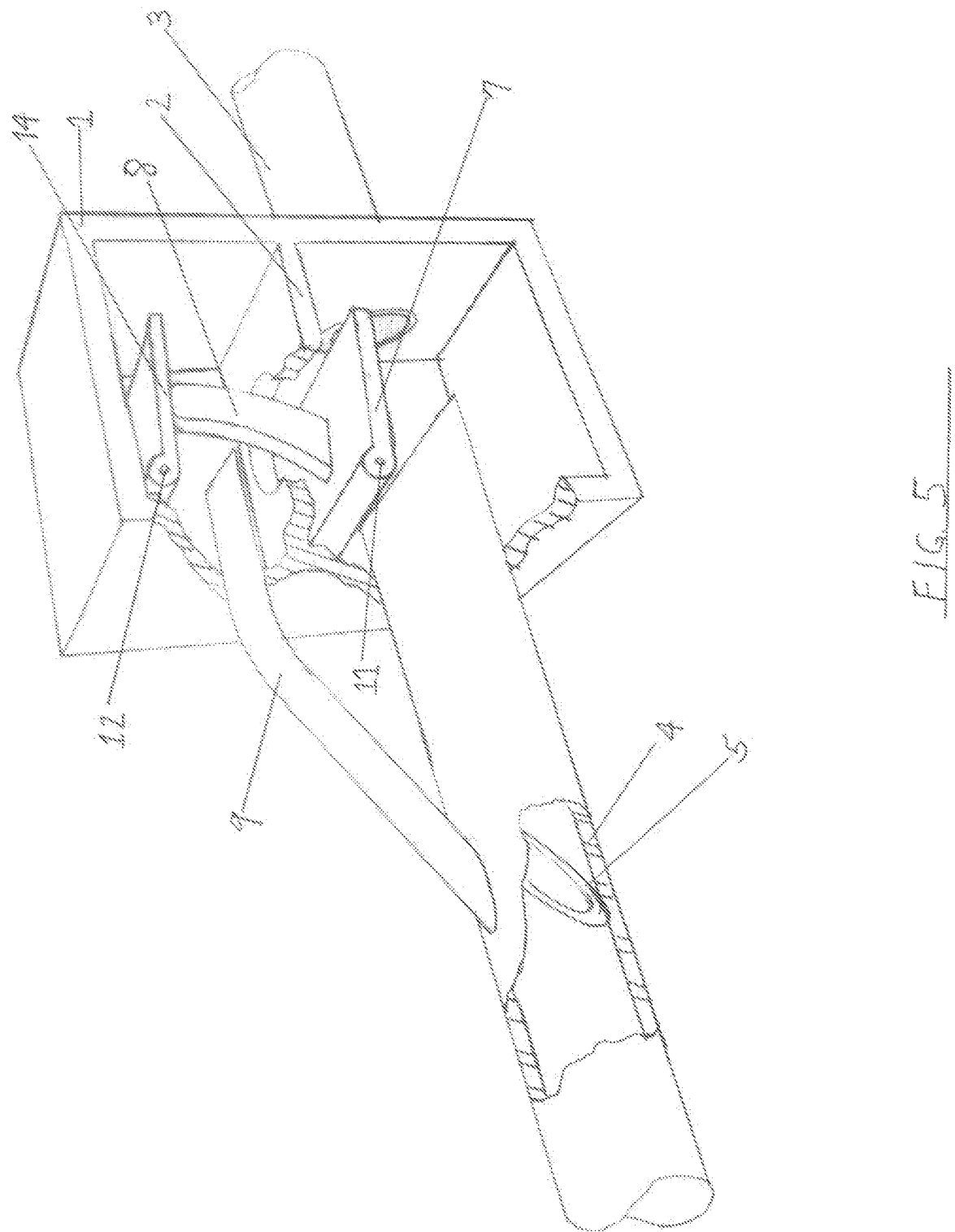
FIG. 5 is a different stripped-down cutaway isometric view of the valve as it would appear while in the open configuration.

Referring now to FIG. 5, again the valve is shown in the open position, as in FIG. 4, but from a different perspective, with the main gate, 7, having been pivoted on its hinge pin, 11, so that its upstream side is held against the seal (not shown) on the underneath side of the partition, 2, and its cam, 8, having lifted the low pressure access tube gate, 14, into the open position.

Now referring to FIG. 6, the valve is shown in an isometric view that allows the viewer to see the reset provision. The primary pivot pin, 11, is shown inside a bearing and seal housing, 23, which is contained in an access box, 24. The end of the pivot pin, 11, is terminated with a spline, square, hex or other drive permitting a wrench to be utilized to turn the pivot pin and the primary gate, 7 (not shown) into the open position. This reset provision may be modified in numerous ways, including providing a fully enclosed motor that can be activated either manually or remotely to reset the valve without direct access to the pivot pin, 11.

The invention claimed is:

1. A valve system operable to automatically close based upon a leak in a downstream portion of a pipeline, comprising: the pipeline comprising: a flow of transported material that enters the pipeline in an upstream portion of the pipeline at a first pressure and exits the pipeline from the downstream portion of the pipeline; and the downstream portion of the pipeline comprising a flow restrictor operable to, when the pipeline is intact, create a second pressure lower than the first pressure in a low-pressure portion of the downstream portion of the pipeline; at least one low-pressure access tube connected to the low-pressure portion of the downstream portion of the pipeline and configured to communicate the second pressure; a dual flapper valve connected to the upstream portion of the pipeline and the downstream portion of the pipeline and comprising: a first flapper main gate operable to pivot between an open position wherein the flow of transported material flows through the valve and a closed condition wherein the flow of transported material is stopped from flowing through the valve: and a second flapper low-pressure access tube gate operable to pivot between a first position permitting the second pressure communicated by the at least one low-pressure access tube to keep the first flapper main gate in the open position and, upon the leak in the downstream portion of the pipeline such that the second pressure is not created, a second position blocking the at least one low-pressure access tube.

2. The valve system of claim 1, wherein the dual flapper valve further comprises at least one needle valve attached to the at least one low-pressure access tube and operable to adjust the pressure across the at least one low-pressure access tube.

3. The valve system of claim 1, wherein the first flapper main gate comprises a hinge pin extending to an exterior of the dual flapper valve; and
wherein the hinge pin terminates with an end operable to be turned by a user to reset the first flapper main gate.

4. The valve system of claim 1, wherein the at least one low-pressure access tube is a plurality of low-pressure access tubes connected to the low-pressure portion of the downstream portion of the pipeline and configured to communicate the second pressure.

5. The valve system of claim 4, further comprising at least one needle valve attached to the low-pressure access tubes and operable to adjust the pressure across the low-pressure access tubes.

6. The valve system of claim 1, wherein the first flapper main gate comprises a cam protrusion operable to, when the first flapper main gate is in the open position, hold the second flapper low-pressure access tube gate in the first position.

7. A valve system operable to automatically close based upon a leak in a downstream portion of a pipeline, comprising: the pipeline comprising: a flow of transported material that enters the pipeline in an upstream portion of the pipeline at a first pressure and exits the pipeline from the downstream portion of the pipeline; and the downstream portion of the pipeline comprising a flow restrictor operable to, when the pipeline is intact, create a second pressure lower than the first pressure in a low-pressure portion of the downstream portion of the pipeline; at least one low-pressure access tube connected to the low-pressure portion of the downstream portion of the pipeline and configured to communicate the second pressure; a dual flapper valve connected to the upstream portion of the pipeline and the downstream portion of the pipeline and comprising: a first flapper main gate operable to pivot between an open position wherein the flow of transported material flows through the valve and a closed condition wherein the flow of transported material is stopped from flowing through the valve: a second flapper low-pressure access tube gate operable to pivot between a first position permitting the second pressure communicated by the at least one low-pressure access tube to keep the first flapper main gate in the open position and, upon the leak in the pipeline such that the second pressure is not created, a second position blocking the at least one low-pressure access tube; and a needle valve attached to the at least one low-pressure access tube and operable to adjust the pressure across the at least one low-pressure access tube; wherein the first flapper main gate comprises a cam protrusion operable to, when the first flapper main gate is in the open position, hold the second flapper low-pressure access tube gate in the first position.

* * * * *